United States Patent [19]

Larson et al.

[11] Patent Number: 4,981,151
[45] Date of Patent: Jan. 1, 1991

[54] EXPANDABLE GUIDE RAIL FOR AN AUTOMATIC CAR WASH CONVEYOR

[75] Inventors: Sherman L. Larson, Palmyra, N.J.; Carl C. Beer, Philadelphia, Pa.

[73] Assignee: Sherman Industries, Inc., Palmyra, N.J.

[21] Appl. No.: 457,116

[22] Filed: Dec. 26, 1989

[51] Int. Cl.$^5$ .............................................. B60S 3/04
[52] U.S. Cl. ................................... 134/123; 134/125
[58] Field of Search ............ 15/DIG. 2; 134/45, 123, 134/125

[56] References Cited

U.S. PATENT DOCUMENTS

| | | | |
|---|---|---|---|
| 1,280,950 | 10/1918 | Bernheim | 134/125 X |
| 2,229,605 | 1/1941 | Snyder et al. | 134/125 X |
| 2,490,921 | 12/1949 | Rousseau | 214/1 |
| 2,716,772 | 9/1955 | Cockrell | 15/DIG. 2 |
| 2,718,650 | 9/1955 | Haverberg | 15/21 |
| 2,761,170 | 9/1956 | Bonneau | 15/307 |
| 2,800,671 | 7/1957 | Nowak | 15/21 |
| 2,837,759 | 6/1958 | Haverberg | 15/302 |
| 2,910,202 | 10/1959 | Clarke et al. | 214/340 |
| 3,134,117 | 5/1964 | Frank et al. | 15/21 |
| 3,361,143 | 1/1968 | Daum et al. | 134/45 |
| 3,370,596 | 2/1968 | Daum et al. | 134/45 |
| 3,491,873 | 1/1970 | Fauth | 198/204 |
| 3,511,251 | 5/1970 | Hickman et al. | 134/123 |
| 3,529,611 | 9/1970 | Daum et al. | 134/112 |
| 3,553,422 | 1/1971 | McCoy | 219/121 |
| 3,570,502 | 3/1971 | Farnsworth et al. | 134/45 |
| 3,596,241 | 7/1971 | Migneault | 340/61 |
| 3,660,159 | 5/1972 | Larkin, Jr. | 134/32 |
| 3,681,805 | 8/1972 | Shelstad et al. | 15/21 R |
| 3,775,799 | 12/1973 | Talbot et al. | 15/21 E |
| 3,913,162 | 10/1975 | Parkin | 15/21 C |
| 4,023,228 | 5/1977 | Hanna | 15/53 B |
| 4,178,948 | 12/1979 | Swinehart | 134/45 |
| 4,424,823 | 1/1984 | Cougoulas | 134/45 |

*Primary Examiner*—Philip R. Coe
*Attorney, Agent, or Firm*—Seidel, Gonda, Lavorgna & Monaco

[57] ABSTRACT

A guide rail apparatus to be used within an automatic car wash including two parallel rails for directing the travel of the car tires along the conveyor within the car wash. The gap between the rails is expandable for accepting a range of wide and narrow tires as found on various cars. At least one of the two rails includes a series of rigid tubular rail portions which are attached to a biasing apparatus. The biasing apparatus may include a pivot which is supported with respect to a fixed surface by an elastomer material. The portions of the pivoting rail are connected by a flexible member so as to form a continuous rail length and to permit pivoting of one portion of the rail while an adjacent portion along the length remains in its normal inwardly biased position. The biasing apparatus may also include a projecting rod that pivotally supports the ends of the tubular rail positions. The inward bias of the rail of the present invention towards the gap positions a relatively smaller tire in contact with the pusher roller portion of the car wash conveyor and prevents the tire from turning sideways and running out of the conveyor track.

33 Claims, 7 Drawing Sheets

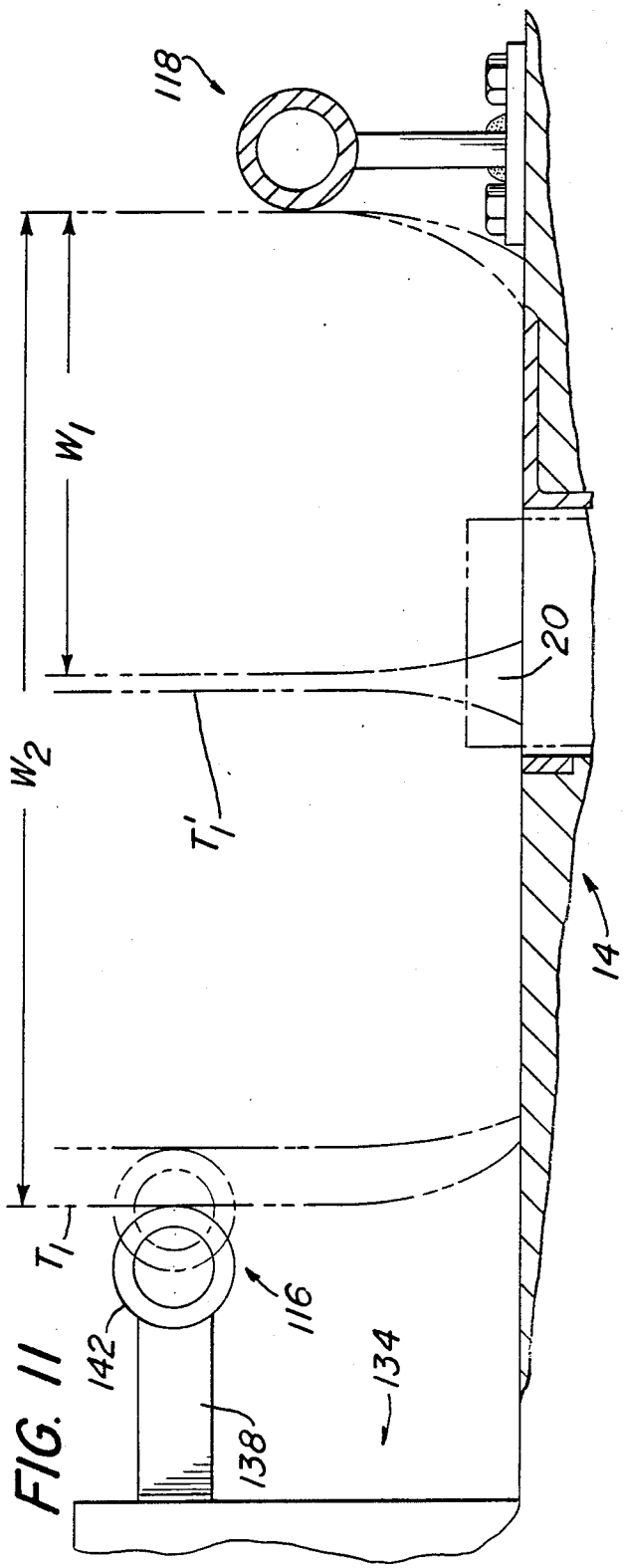
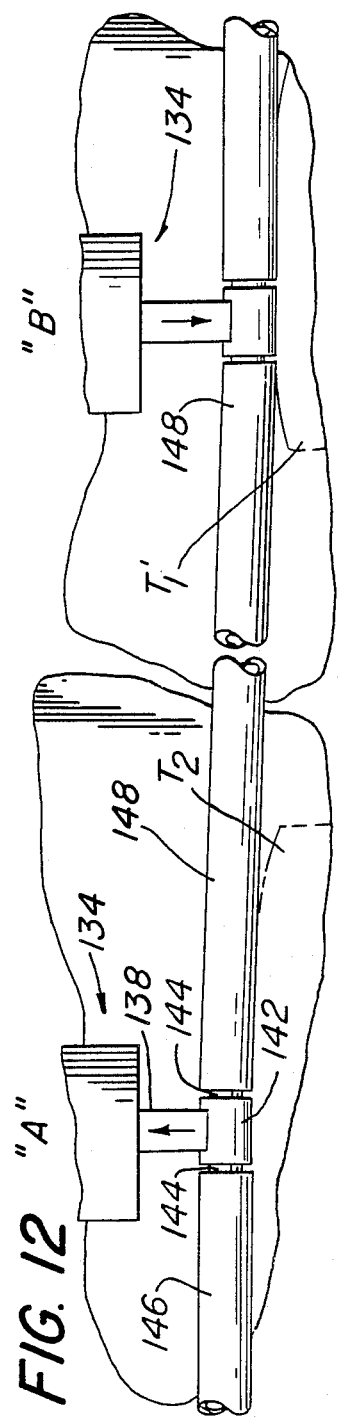

EXPANDABLE GUIDE RAIL FOR AN AUTOMATIC CAR WASH CONVEYOR

BRIEF DESCRIPTION OF THE INVENTION

The present invention is an apparatus for use within an automatic car wash. The invention is particularly suited for use within a car wash of the type having a conveyor track positioned along the length of the car wash for moving a car through the various stages of the wash cycle. The apparatus of the present invention is a guide rail adapted to accept car tires having a variety of widths to maintain contact between the tire and the portion of the conveyor moving the car through the car wash cycle.

BACKGROUND OF THE INVENTION

Although car washes have various forms and include various structures, a common type includes a tunnel or the like having various stages which sequentially wash the car as it moves through the tunnel. This type of car wash includes a conveyor that engages one of the tires of the car to move the car through the tunnel without requiring the motive power to be supplied by the car itself. The conveyor includes a series of pusher rollers or the like which travel along a track positioned within a trench below the car wash floor. The pusher rollers are attached to a continuous chain or the like which is driven the length of the conveyor track. Upon admittance of the car into the car wash entrance, the pusher roller protrudes a preset distance above the floor. The protruding roller is then moved forward by the continuous chain and engages the car tire to move the car along the track.

Typically, automatic car wash conveyors include a pair of fixed rails which are positioned adjacent the length of the conveyor track to maintain the car in substantially the center of the car wash tunnel at all stages of the car wash cycle. Additionally, the rails are provided to position the car tire to be engaged by the pusher roller so that the car is moved through the wash cycle. Moreover, since typically the driver is not in the car to steer, the guide rails cooperate with the pusher roller to direct the moving car through the car wash cycle without the need for driver assistance. In most cases, the inner rail acts as a reference line by which the car is centered with respect to the various stages of the car wash within the tunnel.

Different cars are typically provided with tires having different widths, usually in the range of 6 to 13 inches. Thus, for a car wash to accept cars having relatively wider tires, it must provide guide rails which are separated a distance sufficient to admit these tires. This same car wash must also successfully direct cars having smaller width tires. If the guide rails are fixed at the width of the larger tires, it is possible for a smaller tire to turn sideways and run over the guide rails. This may cause the car to move out of the line of the car wash tunnel, possibly causing damage to the car and car wash equipment. Additionally, on some models of car wash conveyors, the pusher roller is limited in width. Thus, if the guide rails are fixed at a width to accept the larger tires, a smaller width tire may be completely missed by the pusher roller or may be pinched between the pusher roller and the guide rail causing damage to the tire or the conveyor.

It is known to provide apparatus within a car wash that adjusts to the width between tires on opposite sides of the car. An example of such adjustment means is a device which applies a brushing action to the side walls of the tires. (See U.S. Pat. Nos. 2,910,202; 3,681,805; and 4,023,228.) It is also known to adjust the position of spray nozzles within a car wash with respect to the sides of a car by sensing the position of the tires. (See U.S. Pat. Nos. 4,178,948 and 4,424,823.) However, the prior art does not include apparatus which adjusts the position of a guide rail on the conveyor to accept tires having various widths while accomplishing the desired function of maintaining the car in position within the car wash and in contact with the pusher roller on the conveyor track.

SUMMARY OF THE INVENTION

The present invention is a guide rail apparatus for a car wash of the type typically having a conveyor for directing a car through the various stages of the car wash cycle. The guide rail apparatus includes first and second longitudinally extending rails positioned parallel to one another and having a gap therebetween for accepting the tires on one side of the car. At least one rail is movably supported such that its lateral position with respect to the opposing rail is variable. Means is provided for resiliently biasing the movable rail toward the fixed rail such that the normal position of the rails causes contact between the tire and the pusher roller of the conveyor. For relatively larger tires, the guide rail will move against the biasing force to expand the gap between the rails. Alternatively, both guide rails may be movable. The movement of the guide rail to enlarge the gap may be made by a pivoting motion so that the rail moves through an arc with respect to the conveyor structure. Alternately, the movement of the guide rail to enlarge the gap may be made by a linear movement of the rail support structure in a direction transverse to the length of the conveyor track.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 2 is a cross sectional view of the embodiment shown in FIG. 1 having different size tires therein.

FIG. 3 is a top plan view of the embodiment shown in FIGS. 1 and 2.

FIG. 11 is a cross-sectional view of the second embodiment showing different size tires therein.

FIG. 12 is a top plan view of the second embodiment as shown in FIGS. 7-11.

DETAILED DESCRIPTION OF THE DRAWINGS

Figure 1:
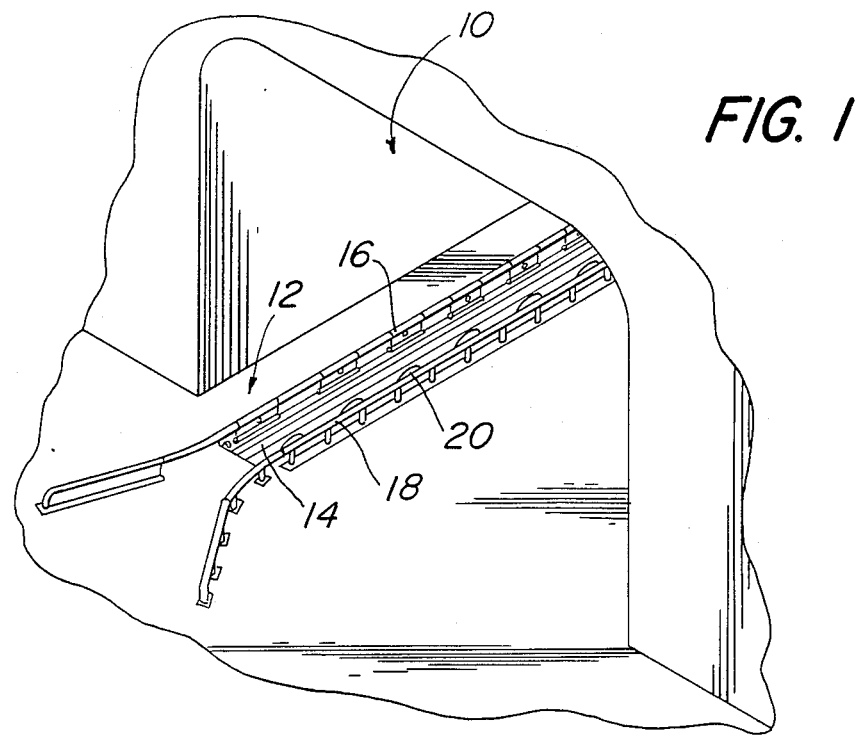
FIG. 1 shows the entrance to a typical car wash having a first embodiment of the guide rail apparatus of the present invention therein.
Figure 4:
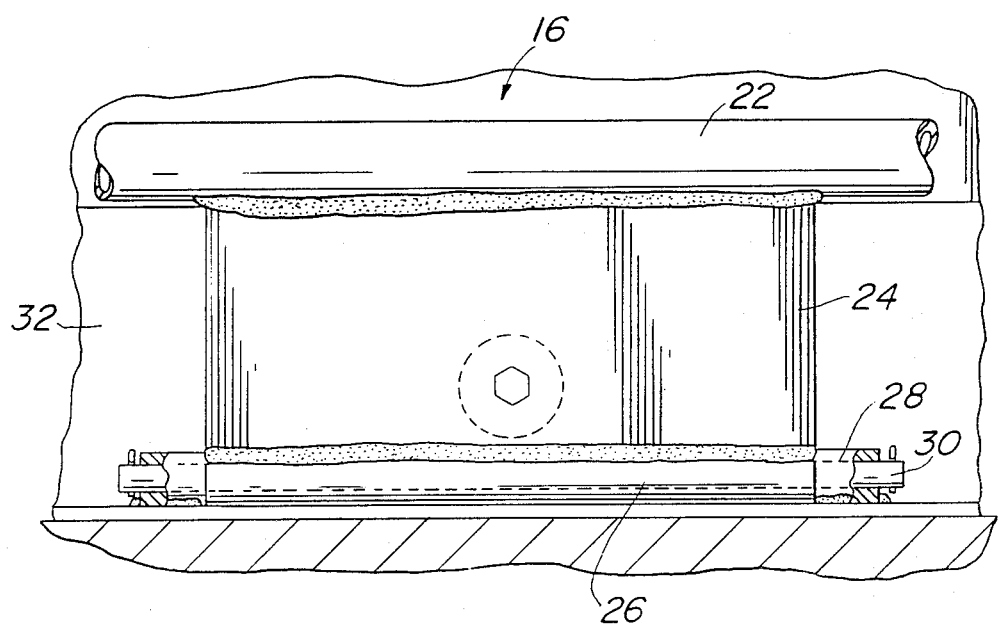
FIG. 4 is a side elevation of a portion of the embodiment shown in FIGS. 1–3.

In the drawings, where like numerals indicate like elements, there is shown in FIG. 1 the entrance to a typical automatic car wash 10 equipped with a first embodiment of a guide rail apparatus 12 of the present invention. The guide rail apparatus 12 is positioned along a conveyor track 14 mounted within a trench (not shown) in the floor of the car wash 10. The conveyor 14 is contemplated to be that typically found in existing car washes and includes a series of pusher rollers 20 which move along the length of the car wash 10. The structure of the conveyor means 14 and the pusher roller 20 are generally known in the art. Apparatus 12 includes a first rail 16 and a second rail 18. Second rail 18 is the inner rail, i.e., the closest to the longitudinal center line of the tunnel of the car wash 10. Description of the conveyor 14 and the apparatus along the length of the car was tunnel 14 beyond that which is required to describe the operation of the present invention need not be included herein and does not form a portion of the present invention.

As can be more clearly seen in FIGS. 2 and 3, first guide rail 16 includes at least one tubular rail portion 22 supported on a flange 24. Flange 24 is fixed to the floor surface at a pivot 26. The rail 22 is welded to one end of flange 24. The opposite end of flange 24 is welded to pivot 26. The pivot 26 is formed by pin 30 inserted into sleeve 28. Pin 30 is fixed such that the sleeve 28 may rotate around the outside surface of pin 30. Rail 16 is generally supported on an L-shaped beam 32 positioned along the length of the conveyor track 14 and bolted or otherwise fixed to the floor. Pivot 26 is fixed to the lateral portion of beam 32.

Flange 24 is attached to the vertical portion of beam 32 by biasing means 34. First rail 16 is normally biased inwardly towards the gap between the two rails 16, 18. Biasing means 34 includes a resilient elastomer spring 36 which is positioned between flange 24 and the vertical web of beam 32. A bolt 38 extends through flange 24, elastomer 36 and beam 32, and is fixed in position by nuts 40 at one end. A coiled spring 42 is positioned between nuts 40 and beam 32 on bolt 38.

In FIG. 2, tire $T_1$ having a width $W_1$ is positioned within the gap between rails 16, 18 and is in contact with the inside of fixed rail 18. Tire $T_1$ in this position is in engagement with the pusher roller 20 of the conveyor 14. A wider tire $T_2$ having a much larger width $W_2$ is received within the gap between the rails 16, 18 and causes the first rail 16 to pivot against the elastomer 36 to enlarge the gap. Spring 42 acts to move the head of bolt 38 away from the side wall of the tire $T_2$, thus preventing the structure of the pivot means 26 and the biasing means 34 from scraping the side wall of the tire $T_2$.

Figure 5:
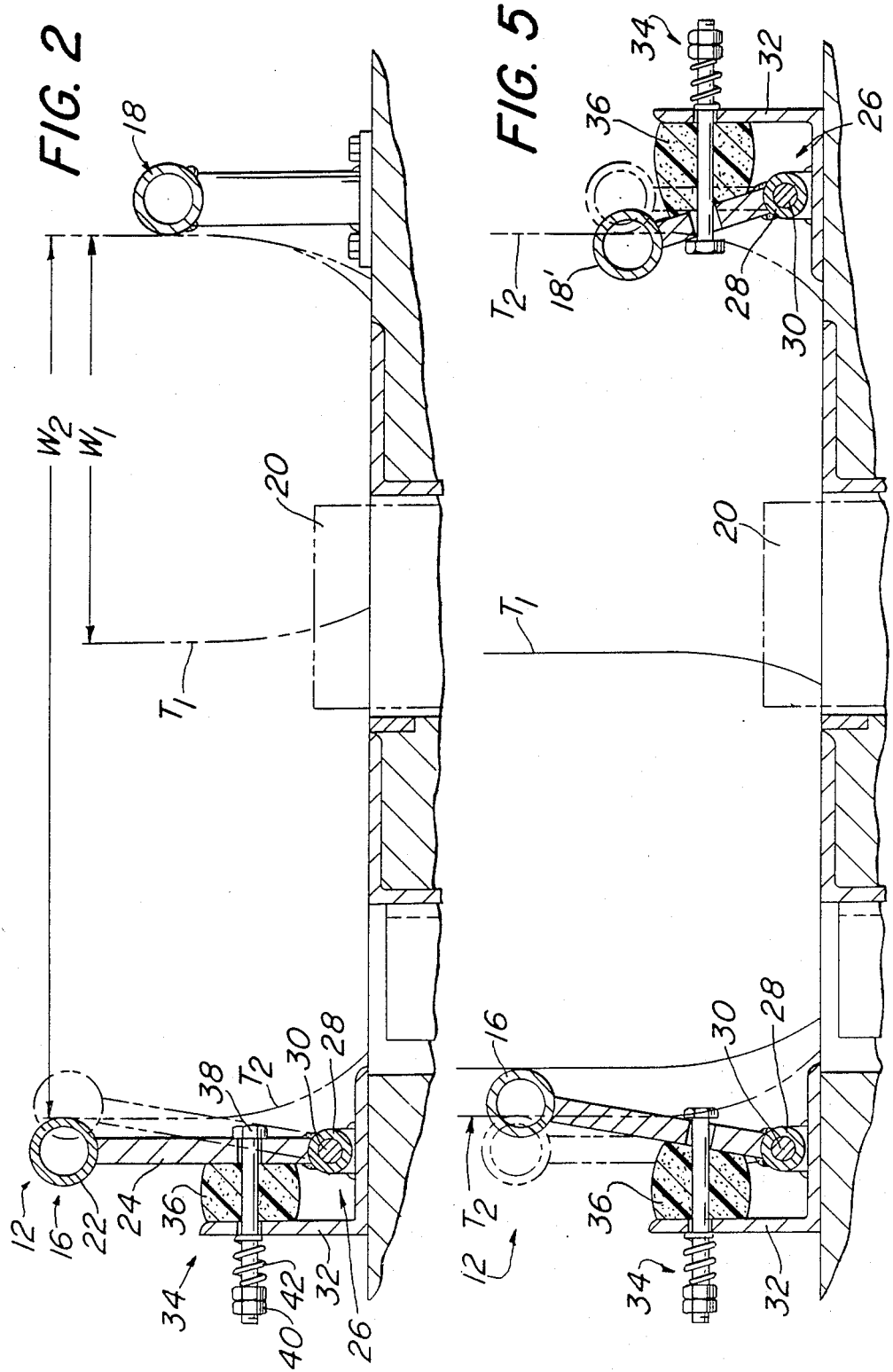
FIG. 5 is a cross sectional view of a variation of the embodiment shown in FIGS. 1–4 having different size tires therein.

FIG. 5 illustrates a variation of the embodiment of the guide rail apparatus 12 shown in FIGS. 1-4. This variation of the guide rail apparatus includes a movable first rail 16 and a movable second rail 18'. Both rails are biased inwardly by substantially identical biasing structure 34.

In the variation of the first embodiment of the guide rail apparatus shown in FIG. 5, the relatively smaller tire $T_1$ is shown positioned on the side of the gap adjacent first rail 16 and in contact with rail 16 in its normal inwardly biased position. In this position, tire $T_1$ will remain in contact with the pusher roller 20. It is preferred that the contact between smaller tire $T_1$ and movable rail 16 does not significantly force the rail to move against the force of biasing means 34. This relationship would also be desired for the contact between tire $T_1$ with the movable rail 18' (not shown).

A top view of the guide rail 16 is shown in FIG. 3. A series of tubular portions 22 extend along the length of the conveyor 14. Each portion of the rail 16 extends for a distance approximately the length of a single car. Alternatively, these tubular portions 22 may be individual members which contact only one tire at a time (not shown). Between each adjacent portion 22 is provided flexible tubing 44 so that the rail 16 is substantially continuous along its length. The ends 46 and 48 of tubing 44 are engaged within the interior of adjacent portions 22. As shown, tire T is positioned adjacent to a first portion 22 and is beginning to contact the flexible tubing 44. Since tire T has not yet engaged the next tubular portion 22 of the rail 16, this second portion 22 is in its normal inward position. Thus, the expansion of the gap between the rails 16 and 18 occurs only in the area along conveyor 14 where the car is located. Other cars within the car wash 10, having different size tires, will be properly positioned within the guide rail apparatus 12 without being affected by the adjacent car in the line.

Figure 6:
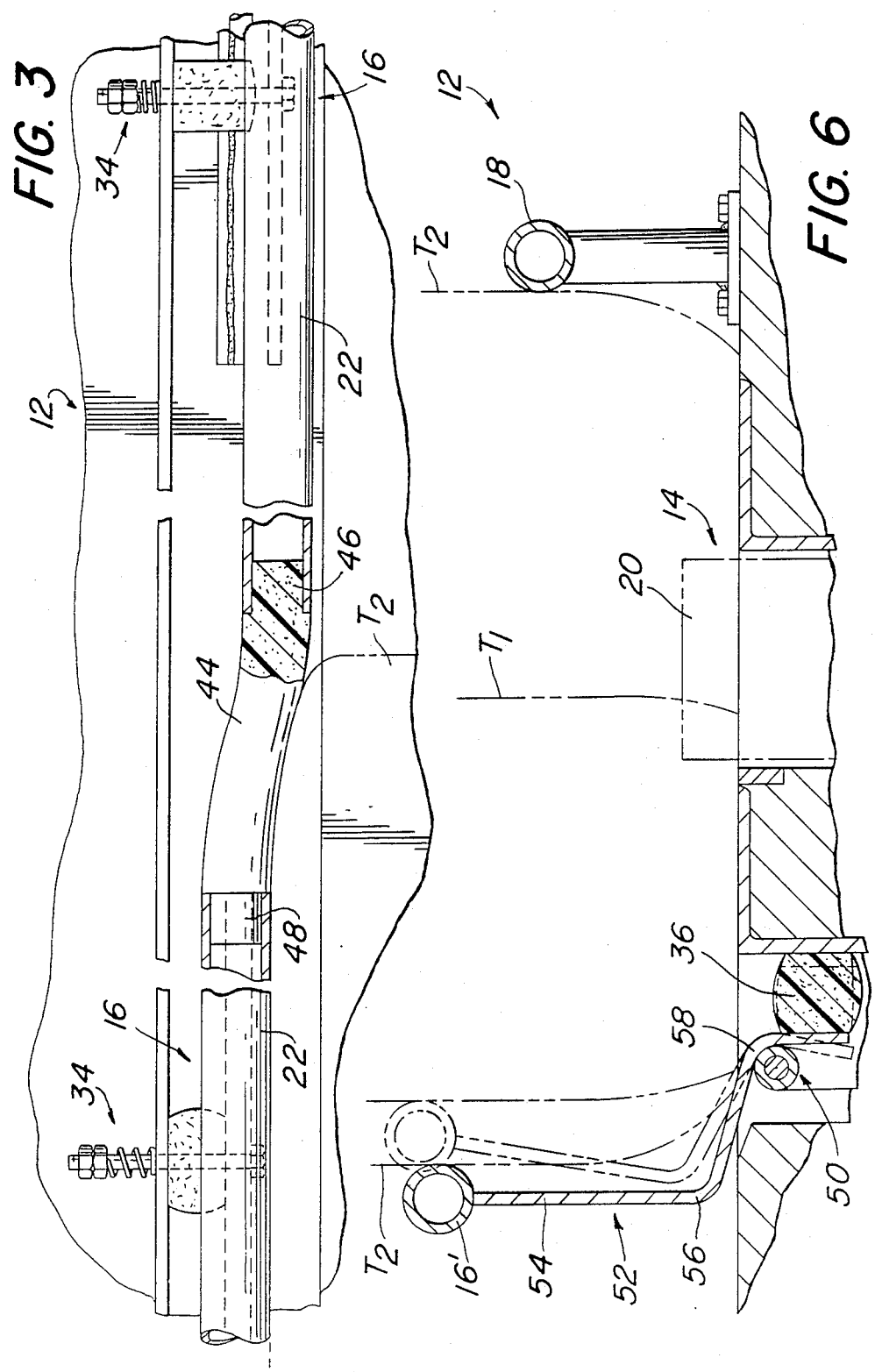
FIG. 6 is a cross sectional view of another variation of the embodiment shown in FIGS. 1–5 also having different size tires therein.

FIG. 6 shows another variation of the guide rail apparatus 12 including a pivot 50 for rail 16' positioned below the floor of the car wash 10 within the trench for conveyor 14. The first guide rail 16' includes a tubular rail portion 22 attached to angled bracket 52. Bracket 52 includes an upwardly projecting portion 54, a lateral portion 56 and a contact portion 58. Bracket 52 is attached to pivot 50 at the intersection between lateral portion 56 and contact portion 58. Contact portion 58 engages an elastomer 36 attached to the side of the conveyor 14. If the first guide rail 16' is moved outwardly by tire T, by contact between the sidewall of the tire T and rail 16' and/or the bottom of the tire T and lateral portion 56. The elastomer 36 is compressed by contact portion 58 against the side wall of the conveyor 14.

The gap between the movable rail 16 and rail 18 in FIG. 2; movable rails 16 and 18' in FIG. 5; or movable rail 16' and rail 18 in FIG. 6 (or any combination thereof) is contemplated to be such that the smaller tire $T_1$ is not permitted to turn sideways and run over the rails. Each of the variations shown in the drawings further contemplate that the guide rail apparatus 12 may be provided within an existing car wash 10. In the variation of this first embodiment particularly shown in FIG. 2, movable rail 16 is contemplated to replace a fixed rail existing in the car wash. This movable rail 16 is mounted within the car wash to set the maximum gap between the rails to the desired maximum tire width to be accepted by the car wash. This gap may constitute an increase in the tire size that was previously capable of being received by the fixed rails. Thus, after movable rail 16 is mounted, the pusher roller 20 may be off center between the rails 16, 18. Tire $T_1$ having a width of $W_1$ in contact with the movable rail 16 (similar to that shown in FIG. 5), will also contact the pusher roller 20 a sufficient amount for it to engage the tire $T_1$ and move it along the conveyor track 14. If the rails in the car wash are fixed to the width $W_2$ of larger tire $T_2$, rather than being movable, and tire $T_1$ is in contact with rail 16 instead of rail 18, the pusher roller 20 may miss the smaller tire $T_1$ or only partially, contact the tire $T_1$ causing the pusher roller to pinch the tire against rail 16 causing damage to the tire and possibly the conveyor as well.

The movement of rails 16 and 18 in FIG. 2; rails 16 and 18' in FIG. 5; as well as rails 16' and 18 in FIG. 6 is not necessarily dictated by the fact that the guide rail apparatus 12 of the present invention is being installed in an existing car wash. Engagement of the pusher roller 20 with the tire $T_1$ must be sufficient for the pusher roller to move the tire along the conveyor track. If the sidewalls of the tire are permitted to flex in response to contact with the roller 20, the tire may become pinched between the guide rail and the roller causing damage thereto regardless of whether the pusher roller is off center in the gap between the rails Additionally, even though it is generally contemplated that the maximum width of the gap will be set by the width of the tire $W_2$, the existence of both 13 inch and 6 inch tires in the current marketplace is also not limiting. Moreover, the minimum width of the pusher roller is not limited to being 3 inches, as is commonly found in existing car wash conveyors 14. Other dimensional relationships are contemplated by the present invention. These dimensions may affect the overall placement of the rails on opposite sides of the pusher roller, but do not affect the overall advantages of the guide rail apparatus 12 of the present invention.

Figure 7:
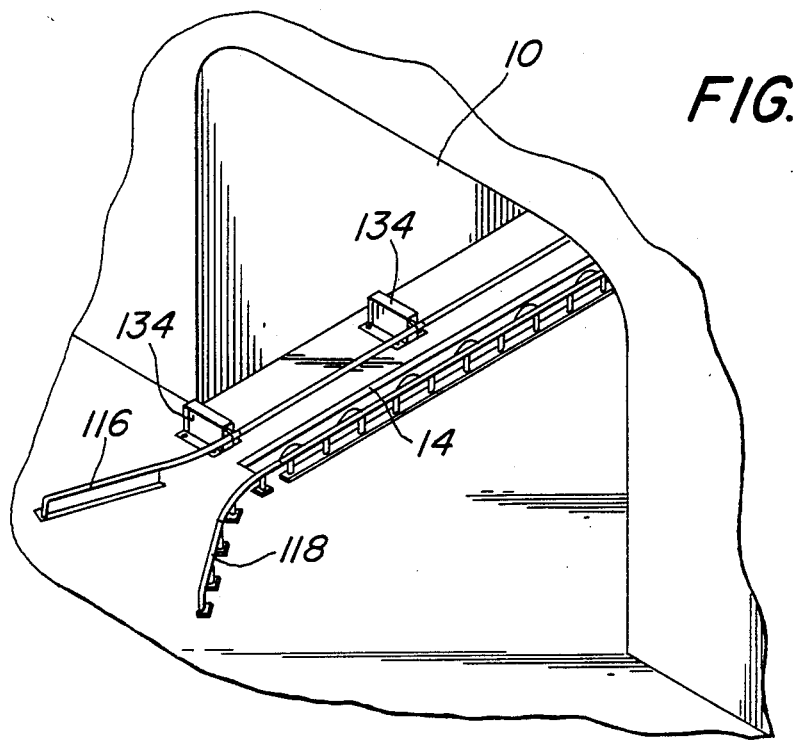
FIG. 7 shows the entrance to a typical car wash having an alternate embodiment of the guide rail apparatus of the present invention therein.

FIG. 7 shows the entrance of a typical car wash having a second embodiment of a guide rail apparatus 112 as contemplated by the present invention. This second guide embodiment 112 includes a movable guide rail 116 positioned on the opposite side of the conveyor 14 from a fixed guide rail 118. The movable guide rail 116 is supported by a series of biasing means 134 spaced along the length of the conveyor 14.

Figure 8:
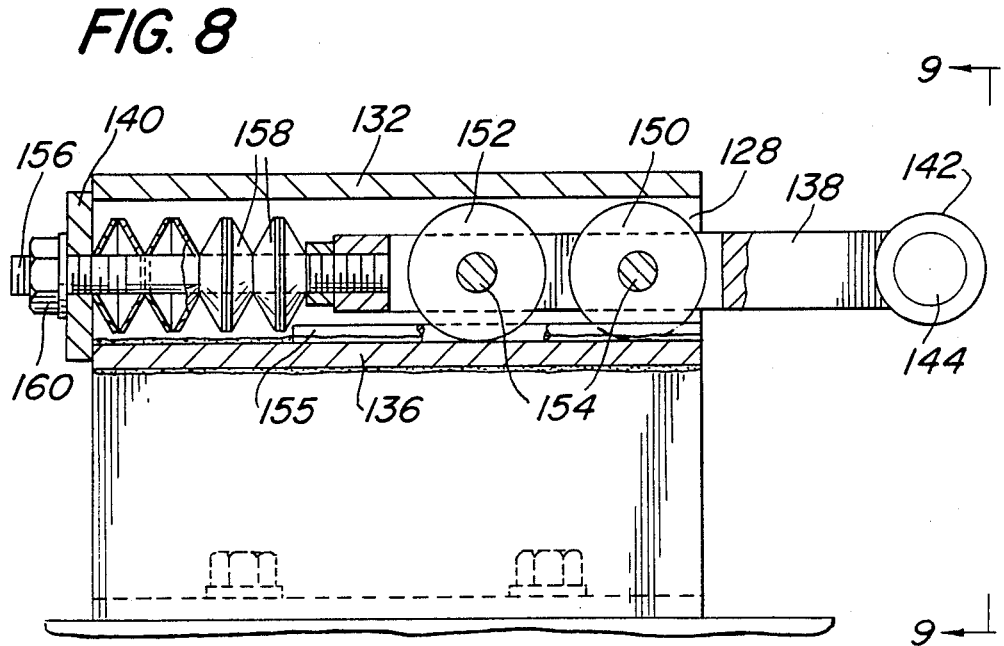
FIG. 8 shows a cross-sectional view of the alternate embodiment shown in FIG. 7.
Figure 9:
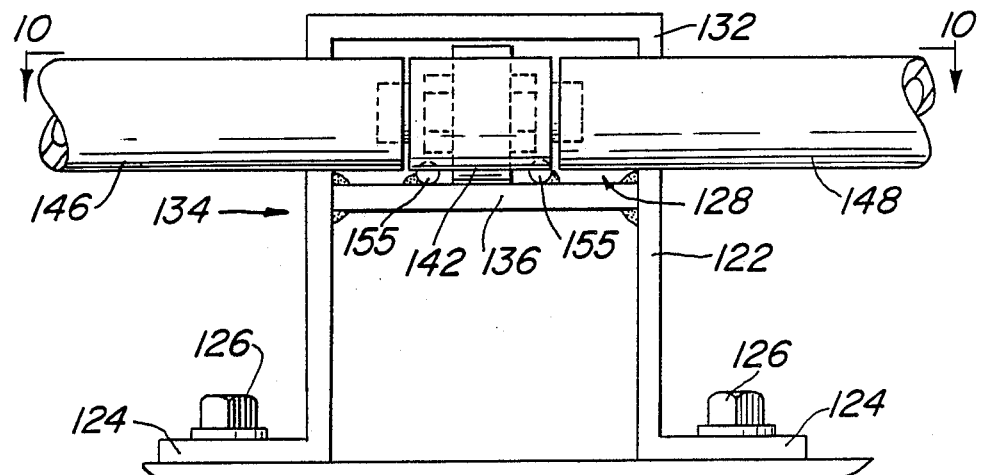
FIG. 9 shows a front elevation of the alternate embodiment as taken along line 9—9 in FIG. 8.
Figure 10:
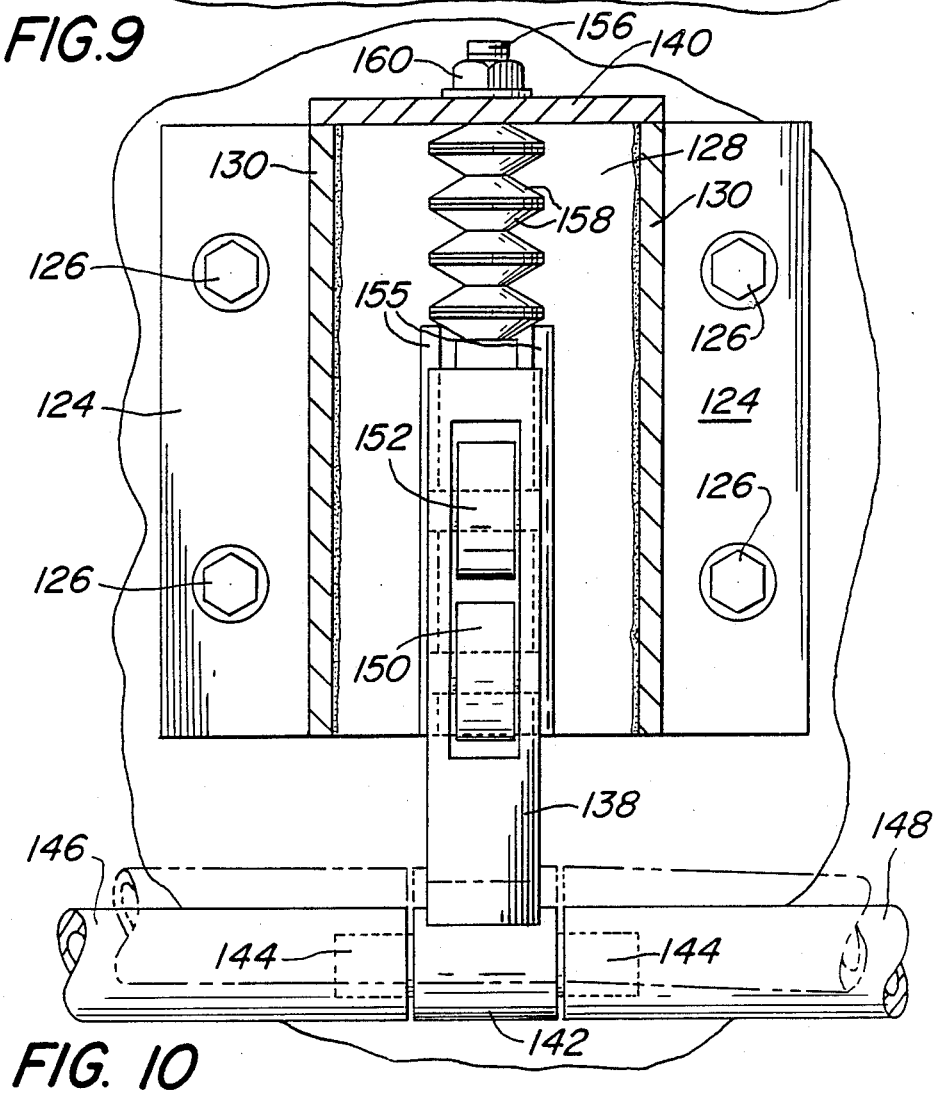
FIG. 10 shows a second cross-sectional view of the alternate embodiment shown in FIGS. 7-9.

In FIGS. 8, 9 and 10 there is shown detailed views of the biasing means 134 as contemplated by this second embodiment 112 of the present invention. Biasing means 134 includes a housing 122 attached to the floor of the car wash 10. Bolts 126 engage flanges 124 and lock housing 122 to the floor. Within the housing 122 is a chamber 128, defined by the side walls 130 and top 132. The lower wall of chamber 128 is defined by transverse member 136 which is supported on opposite side walls 130 in a spaced and parallel relationship with top wall 132.

Positioned within the chamber 128 is biasing rod 138. One end of rod 138 projects from the front end of the housing 122. The opposite end of rod 138 is fixed to support flange 140 at the end of chamber 128. The projected end of biasing rod 138 includes a pivot 142 having projections 144. Projections 144 extend a short distance from the rod 138, transverse to its length. Tubular rails 146 and 148 are supported at one end on projections 144. Projections 144 are contemplated to provide play between the inside diameter of rail 146 and rail 148 so that a pivoting action may take place. The opposite ends of tubular rails 146 and 148 (not shown) are contemplated to be supported on the pivot 142 of the adjacent biasing means 134 along the car wash 10.

The biasing rod 138 is supported within the chamber 128 of the housing 122 on casters 150, 152. Casters 150, 152 are supported on shafts 154 which are fixed within rod 138. Casters 150 are retained within a fixed track defined by curb members 155 welded to transverse member 138. A threaded member 156 extends from one end of biasing rod 138 and projects through the support flange 140. Positioned on member 156 is a series of disc springs 158. Springs 158 have a frusto-conical configuration and are arranged in pairs such that large diameter ends of adjacent spring pairs are in contact with one another. The disc springs 158 are preferred since the spring force provided by the springs 158 is substantially constant during compression. These type springs are also preferred due to their wear capabilities. The disc springs may be those made by Key Bellevills Inc. of Leechburg, Pa. However, a number of substitutes are contemplated for providing a biasing action for the rod 138. Air pressure, compression springs or any other number of substitutes providing a reaction force upon an inward movement of the rod 138 may be utilized, whether or not a constant return force is provided thereby. Member 156 is attached to the housing 122 by bolt 160 which is adjacent to support flange 140.

In FIGS. 11 and 12 the operation of the biasing means 134 is shown. As previously described, a tire $T_1$ having a width $W_1$, which is less than the overall width of the gap between the opposing rails 116 and 118, will typically move toward the center of the car wash 10. In this position the tire $T_1$ will be in contact with the pusher roller 20 which moves the car down the conveyor track 14 through the various stages of the car wash 10. Also, when the tire $T_1$ is in this position, the biasing means 134 is projected inwardly (dotted lines) towards the fixed guide rail 118. If the smaller tire $T_1'$ is positioned on the opposite side of the gap, the tire $T_1'$ will engage the tubular rails 146, 148 fixed to pivot 142 in this inward position. This engagement will provide contact between the tire $T_1'$ and the pusher roller 20.

A relatively larger tire $T_2$ having a width $W_2$ will move the rod 138 inwardly to enlarge the gap between the rails. Contact between the tire $T_2$ and rails 146, 148 or pivot 142 will cause rod 138 to move inwardly against the biasing force of springs 158, as particularly illustrated in FIG. 12 at position A. As shown at position B, the other segments of the movable guide rail 116 remain biased inward, with the enlargement of the gap being only in the area of the larger tire $T_2$. Thus, if smaller tires $T_1'$ provided on the front wheels of a car are at position B or if the next car along the length of the car wash 10 includes smaller tires $T_1'$ than the car at position A, the relative inward position of the rails 146 and 148 will maintain the smaller tires in contact with the pusher roller 20.

Figure 13:
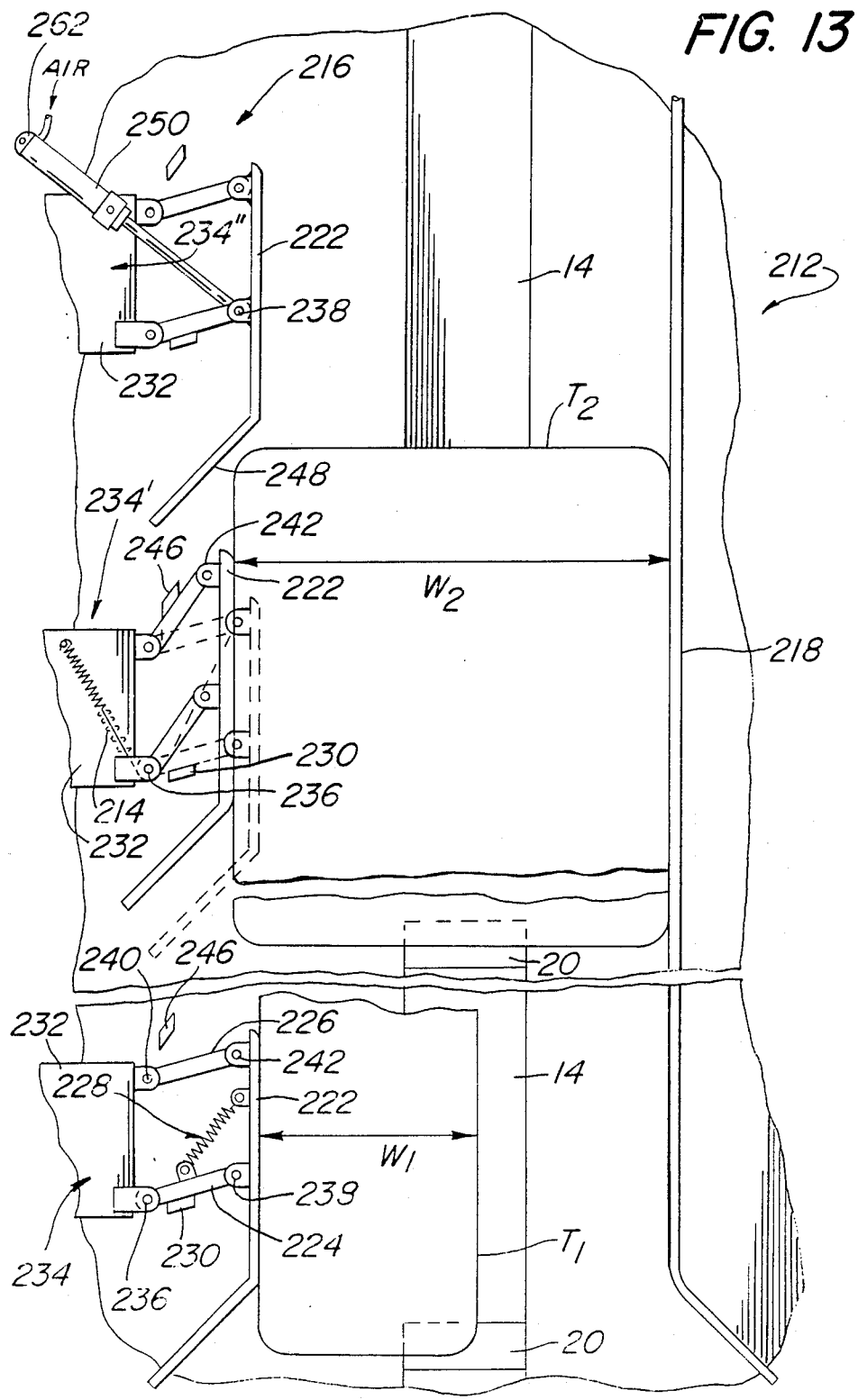
FIG. 13 is a top plan view of a third embodiment of the present invention.

FIG. 13 shows a three variations of third embodiment of the present invention. This third guide rail embodiment is generally designated by numeral 212 and includes a fixed rail 218 and a movable rail 216. The movable rail 216 generally comprises a series of rail segments 222 which are supported on a biasing means. The biasing means shown in three variations are identified as 234, 234' and 234''. The rail segments 222 are positioned on the opposite side of the conveyor track 14 from the fixed rail 218 similar to that in the previously discussed embodiments. The pusher roller 20 is conveyed down the conveyor track 14 to move the car tires along the length of the track, thus moving the car through the stages of the car wash.

The first variation of biasing means 234 includes a fixed base 232 having two links 224 and 226 extending therefrom to support the rail segment 222. The links 224, 226 are attached at opposite ends to the base member 232 and rail segment 222 at pivots 236, 238, 240 and 242, respectively. The links 226, 224, the base member 232 and the rail segment 222 form a parallel linkage. This parallel linkage maintains the rail segment 222 generally parallel with the fixed rail 218 and the conveyor track 14 during movement transverse to the length of the rail 216. Extending between the rail segment 222 and link 224 is a compression spring 228. The compression spring 228 forces the rail segment 222 inwardly towards the gap between the movable rail 216 and fixed rail 218. A limit stop 230 is provided to set the inward most position of the rail segment 222.

When a tire $T_1$ having a width $W_1$, which is less than the width between the movable rail 216 in its normal inwardly biased position and the fixed rail 218, when in contact with the rail segment 222 will contact the pusher roller 20. When a larger tire $T_2$ is directed into the gap between the rails 216 and 218, the gap is expanded by relatively outward movement of rail segments 222. In the first biasing means variation 234, the compression spring 228 will compress along with the movement of the parallel linkage. A tire $T_2$ having a width $W_2$ that is larger than the normal width of the gap between the rails 216 and 218 is particularly shown adjacent to biasing means 234'.

Biasing means 234' is essentially the same as that shown for version 234 excepting that a tension spring 244 is utilized to create the inward biasing action. Tension spring 244 is secured at one end to base 232, extends around pivot 236 and is fixed at its opposite end to pivot 242. Since the width $W_2$ of the tire $T_2$ is greater than the normal inward position of rail segment 222, the tire forces the rail segment 222 outwardly from rail 218. The outward movement of spring 244 is limited by limit stop 246. Upon the pusher roller 20 moving the tire $T_2$ beyond the position of the rail segment 222, the tension spring 244 will cause the parallel linkage to move the rail segment 222 relatively inward towards the gap between the rails 216 and 218.

As particularly illustrated with respect to biasing means 234", tire $T_2$ moving from one rail segment 222 to the next rail segment contacts an angled flange 248 which is integrally formed with the rail segment 222. This contact of the tire $T_2$ and flange 248 moves the parallel linkage progressively outwardly. This angled flange 248 prevents the tire $T_2$ from striking a sharp edge or from rolling over the rail segment 222. Biasing means 234" includes an air cylinder 250 which is fixed at one end to a pivot 252 and at the opposite end to pivot 238 of the parallel linkage. The supply of air forces the rail segment 222 relatively inwardly towards the gap between the rails 216 and 218. The positioning of tire $T_2$ having a width $W_2$ within the gap forces the rail segment 222 outwardly and causes compression of cylinder 250.

As can be seen, the variations of the biasing means 234, 234' and 234" in this third embodiment operate similarly. However, it is contemplated that other type linkage and biasing means may be utilized. Further, it is contemplated that rail segments 222 may form a continuous rail similar to that in the alternate embodiments of the present invention. Flexible members (not shown) may be included between rail segments 222. Further variations of each of the embodiments shown herein will become apparent to those skilled in the art upon reviewing the above description.

In each of the embodiments shown, it is contemplated that the movable rail will be positioned approximately 4½ inches from the floor of the car wash or conveyor track. The inside guide rail is contemplated to be positioned at approximately 3 inches from the floor. Such a relationship is desired due to the structures that may underhang the car between opposite tires. Further, the amount of play within the movable guide rails for accepting larger tires $T_2$ or smaller tires $T_1$ as well as the spring force provided against the tire by the biasing means is a variable that may be set by the user or the manufacturer. Further advantages and parameters of the embodiments of the present invention should be apparent by the above description.

The present invention may be used in any type apparatus which requires a vehicle tire to be maintained in a preset position along an extended length. Further, car wash devices other than that shown and described are also contemplated, such as self drive through car wash devices or those having alternate pushing devices and conveyors from that contemplated herein.

The present invention may be embodied in other specific forms without departing from the spirit or essential attributes thereof and, accordingly, reference should be made to the appended claims, rather than to the foregoing specification, as indicating the scope of the invention.

We claim:

1. In an automatic car wash of the type having a series of washing stages positioned along its length for performing the car washing cycle and having a conveyor for moving the car through the stages, a guide rail apparatus comprising:
   first and second rails extending substantially parallel to one another and adjacent the conveyor for at least a portion of the car wash length, the rails adapted to direct the car through the length of the car wash, and
   biasing means resiliently supporting the first rail such that the first rail is movable away from the second rail upon admission between the rails of a car tire having a width greater than the distance between the rails in their normal position.

2. A guide rail apparatus as claimed in claim 1 further comprising pivoting means supporting the first rail and wherein the biasing means resiliently biases the first rail about the pivot means inwardly towards the gap between the rails.

3. A guide rail apparatus as claimed in claim 1 wherein the biasing force of the biasing means is substantially constant with the movement of the first rail.

4. A guide rail apparatus as claimed in claim 1 wherein the biasing means includes a projecting biasing rod which moves transverse to the first rail in response to the admission of the larger tire between the rails.

5. A guide rail apparatus as claimed in claim 4 wherein the biasing force is substantially constant over the amount of displacement of the rod in response to the force of the tire within the gap between the first and second guide rails.

6. A guide rail apparatus as claimed in claim 4 wherein the biasing rod is supported on casters which ride along the track and the track position within a housing.

7. A guide rail apparatus as claimed in claim 6 wherein the biasing force is provided by a series of disc springs.

8. A guide rail apparatus as claimed in claim 1 wherein the first rail includes a series of rail segments positioned substantially end-to-end and each including a corresponding biasing means.

9. A guide rail apparatus as claimed in claim 8 wherein the first rail includes a series of flexible members attached at opposite ends to adjacent rail segments so as to form a continuous guide rail length.

10. A guide rail apparatus as claimed in claim 8 wherein the rail segments include an angled member adapted to be contacted by a tire within the gap between the first and second rail when the preceding rail segment is moved relatively inwardly by the tire and upon movement of the tire from the position adjacent to the preceding rail segment to the subsequent rail segment.

11. A guide rail apparatus as claimed in claim 8 wherein the biasing means further comprises a parallel linkage pivotably attached to the rail segments and a fixed base member.

12. A guide rail apparatus as claimed in claim 11 wherein the biasing means further comprises a compression spring.

13. An apparatus as claimed in claim 11 wherein the biasing means further comprises a tension spring.

14. An apparatus as claimed in claim 11 wherein the biasing means further comprises a air cylinder connected to an air supply means.

15. A guide rail apparatus as claimed in any one of the preceding claims 1 through 14 further comprising a second biasing means for resiliently supporting the second rail.

16. A guide rail apparatus as in any one of claims 11, 12, 13 or 14 wherein the biasing means includes limit stops for determining the maximum inward and outward movement of the rail segments.

17. A guide rail apparatus for a car wash for directing the car through the length of the car wash, comprising:
first and second longitudinally extending rails positioned parallel to one another and forming a gap therebetween,
pivot means supporting the first rail, and
biasing means for resiliently biasing the first rail about the pivot means inwardly towards the gap between the rails, said biasing means adapted to maintain the car tire and the car within a desired position in the car wash and further adapted to permit expansion of the gap between the rails in response to the admission of a larger tire having a width greater than the gap between the rails.

18. A guide rail apparatus as claimed in claim 17 wherein the second rail is supported on a second pivot means and second biasing means resiliently biasing the second rail about the second pivot inwardly towards the gap between the rails.

19. A guide rail apparatus as claimed in claim 17 wherein the first rail includes a series of rigid portions positioned along the length of the conveyor means, each rigid portion pivoting independently.

20. A guide rail apparatus as claimed in claim 19 wherein a flexible portion is provided between adjacent rigid portions such that the first rail is substantially continuous.

21. A guide rail apparatus as claimed in claim 17 wherein the pivot means is fixed to the floor of the car wash and the first rail is supported on a flange attached to said pivot.

22. A guide rail apparatus as claimed in claim 21 wherein the biasing means further comprises an elastomer material positioned between the flange and a support surface adjacent the first rail.

23. A guide rail apparatus as claimed in claim 17 wherein the pivot means further comprises a first portion attached at one end to the guide rail, a second portion attached to the opposite end of the first portion and extending substantially perpendicular thereto, and a contact portion attached to the second portion adjacent the pivot, the contact portion extending below the floor of the car wash and engaging the biasing means.

24. A guide rail apparatus as claimed in claim 17 wherein the pivot means is adapted to pivot the first guide rail such that the gap between the first and second rail is expandable up to at least 13 inches.

25. A guide rail apparatus for maintaining a vehicle in a preset position along an extended length:
a first rail and a second rail positioned parallel to one another and forming a gap therebetween for accepting a car tire,
pivot means supporting the first rail, the pivot means including a flange attached to the first rail, a sleeve portion attached to the flange at the opposite end from the attachment to the first rail, and a pin fixed to a support and positioned within the sleeve, the sleeve being rotatable about the pin such that the first rail is movable in an arc, and
biasing means resiliently supporting the first rail, the biasing means including an elastomer contacting the flange, the elastomer being resiliently compressible in response to a force applied to the first rail such that the gap between the first and second rail is enlarged by the first rail arcing about the pin.

26. A guide rail apparatus for maintaining a vehicle in a preset position along an extended length:
a first rail and a second rail positioned parallel to one another and forming a gap therebetween for accepting a vehicle tire,
biasing means supporting the first rail for resilient movement transverse to its length, the biasing means including
a housing,
a rod movable within the housing projecting from one end thereof and having a pivot on the projected end,
a first portion and a second portion of the first rail on the projected end of the rod, and
spring means providing a biasing force against movement of the rod into the housing, the biasing force being substantially constant over the movement of the rod and maintaining the first guide rail in contact with the vehicle tire at the position of the vehicle along the extended length of the guide rail.

27. A guide rail apparatus for accepting different width tires on adjacent vehicles positioned along a continuous length, the guide rail comprising:
a first and second rail positioned parallel to one another and spaced apart to form a gap therebetween for accepting vehicle tires, the first and second guide rails maintaining the tires within the gap,
the first rail comprising a series of adjacent, independent sections, each section supported for transverse movement with respect to its length and the length of the second rail, means for resiliently biasing each section independently toward the second rail, and means for interconnecting each rail section such that a force applied by a vehicle tire against the biasing means at one section is progressively transferred to the next adjacent rail section upon movement of the tire within the gap toward the next adjacent section.

28. A guide rail apparatus as claimed in claim 27 wherein the biasing means further comprises a parallel linkage that supports the rail sections.

29. A guide rail apparatus as claimed in claim 27 wherein the interconnecting means includes an angled member extending outwardly from the gap formed between the first and second rail, and the rail segments include angled members attached at the forward end thereof along the length of the first rail.

30. An apparatus as claimed in claim 27 wherein the biasing means comprises a compression spring attached at one end to the rail sections of the first rail.

31. An apparatus as claimed in claim 27 wherein the biasing means further comprises a tension spring attached at one end to a fixed base adjacent to the position of the rail sections.

32. An apparatus as claimed in claim 27 wherein the biasing means further comprises an air cylinder having an air supply connected thereto.

33. An apparatus as claimed in any one of claims 27–32 further comprising limit stops for limiting the biasing movement of the rail sections both inwardly towards the gap and outwardly therefrom, against the biasing means.

* * * * *